United States Patent

Fournie

[11] 3,917,473
[45] Nov. 4, 1975

[54] HIGH PRESSURE SEPARATOR
[75] Inventor: Rene Fournie, Pau, France
[73] Assignee: Societe Nationale des Petroles d'Aquitaine, Courbevoie, France
[22] Filed: Feb. 19, 1974
[21] Appl. No.: 443,252

[30] Foreign Application Priority Data
Feb. 21, 1973 France .............................. 73.06122

[52] U.S. Cl. .................................. 55/310; 55/459
[51] Int. Cl.² ........................................ B01D 45/12
[58] Field of Search ............. 55/447, 458, 459, 310

[56] References Cited
UNITED STATES PATENTS
3,653,191  4/1972  Nelson et al. ........................... 55/310
3,710,556  1/1973  Barratt et al. ........................... 55/310
FOREIGN PATENTS OR APPLICATIONS
371,351  3/1923  France ................................. 55/459

Primary Examiner—Bernard Nozick
Attorney, Agent, or Firm—Brisebois & Kruger

[57] ABSTRACT

A high-pressure separator designed to overcome irregularities in separating efficiency, and localize any excess pressure close to safety devices.

This new separator consists of a cylindrical chamber with a cover which, in addition to openings to admit the unseparated mixture and let separated gas out, comprises an elongated first cylinder, projecting downwards inside the chamber and containing a concentric inside cylinder, with which it forms an annular space, into the top of which a mixture supply pipe opens tangentially. The top of this first cylinder consists of a connector attached to the cover and which contains an opening providing communication between the inside of first cylinder and a safety device.

This high-pressure separator is specially designed for high-pressure polythene-synthesis reactors.

10 Claims, 6 Drawing Figures

HIGH PRESSURE SEPARATOR

This invention concerns a high-pressure separator, and in particular the treatment of partly mixable fluids which are subject to major pressure variations.

In high-pressure chemical synthesis, when conversion rates are low, it is preferable to separate the phases under pressure, so that the unconverted phase can be recycled immediately.

For convenience, the drawings will be described at this point, since one of them illustrates the prior art, and is used to explain the background of the invention. In these drawings.

Figure 1:
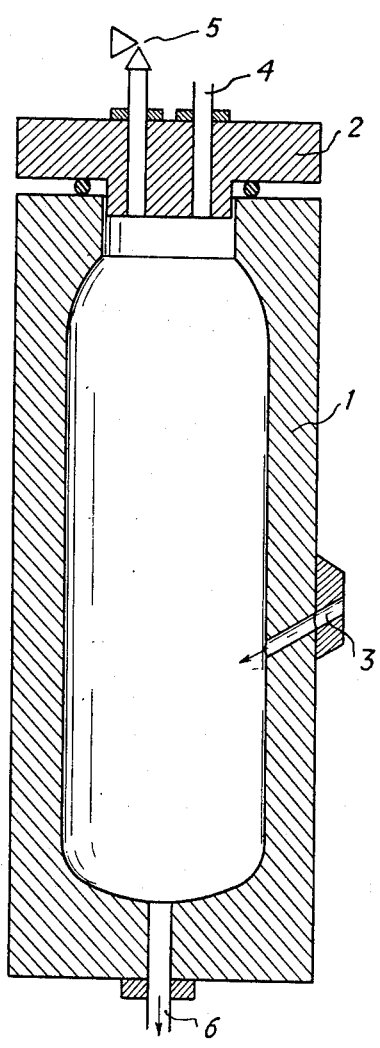
FIG. 1 is an axial sectional view taken through a separator of one type now in use.

FIG. 1 shows a typical example of an existing high-pressure separator. It consists of a vertical cylindrical chamber 1, into which the mixture is fed either through an aperture in the cover 2 or, as in the figure, through a tangential inlet 3, approximately half-way along the cylindrical surface. The mixture to be recycled leaves the chamber through a pipe 4 in the cover, which also contains a passage 5 communicating with a safety device, consisting of a valve or bursting disc. The product leaves the separator through a pipe 6 in the base.

Such appliances present three types of operational difficulties.

To obtain proper gravity separation, a large volume is needed, so that appliances have to be bulky, heavy and expensive.

Irregularities in supply cause the appearance of pressure pulsations inside the chamber, resulting in variations in fluid velocities, so that unseparated products are drawn off for recycling, and separating efficiency drops.

Excess pressures can occur in this type of separator, as the result of accidental exothermic reactions, so that it has to be designed to cope with them: safety devices cannot function until the pressure wave reaches them, and since they are fitted to the cover, the wave has usually already attained the inside surface of the separator before reaching them. In addition, if the device is slow to respond, permanent deformations can appear, damaging the separator.

This invention overcomes these difficulties by considerably increasing the volumetric efficiency of the separating space, through the effect of centrifugal force on the liquid, solid or viscous particles, which are drawn into a helical movement; by reducing pressure pulsations through a restriction in the cross-sectional area of the injection aperture, causing the fluids to accelerate; and finally and most important, by effecting separation inside a reduced space, kept separate inside the cylindrical chamber, with direct communication between this reduced space and the safety device, through an opening in the end attached to the chamber cover.

The high-pressure separator proposed in this invention, for a polyphase mixture obtained by expansion and consisting of gas mixed with liquid, solid or viscous particles, comprises a vertical cylindrical jacket fitted with a cover containing openings for the mixture admission pipe and separated gas outlet pipe, and for the attachment of safety devices, and the base of which contains an outlet for the product, this separator being characterized by the fact that an elongated first cylinder is suspended from the cover and projects downwards inside the jacket, and contains a concentric inside cylinder with which it forms an annular space into which the supply pipe opens, and by the fact that the separated gas outlet pipe opens out of the jacket.

In one recommended embodiment, the inlet pipe opens at a tangent into the top part of the annular space.

In the same embodiment, the top of the first cylinder consists of an end-piece fixed to the cover and comprising an opening through which the inside of the recipient communicates with safety devices.

The dimensions of the first cylinder are such that its outside diameter is approximately two-thirds of the inside diameter of the vertical cylindrical jacket, while its lower end is located approximately half-way down the jacket.

The inside surface of the first cylinder contains a number of spiral-shaped deflectors set at regular distances apart, while approximately the upper two-thirds of the outside surface of the concentric therewithin contains deflectors the same distance apart, which are also spiral-shaped and extend in the same direction and at the same angle as those on the inside surface of the jacket, but offset in relation to them.

The lower third of the concentric cylinder contains evenly spaced holes.

The supply inlet on the inside surface of the jacket is connected through a bent tube and an intervening metal ring to the outside surface of the jacket, which carries another metal ring, which forms an injector.

A bent tube containing a number of holes is attached at one end to the cover, in communication with the outlet opening for the gas for recycling, and is connected at its other end to the outside surface of the recipient by a metal plug.

According to one feature of this embodiment, the two cylinders end at the bottom in a section positioned at an angle of approximately 45° to the adjacent wall of the vertical jacket, and a flange, forming a channel, is fixed to the bottom inside edge of the first cylinder.

In one particular embodiment, the first cylinder touches the inside surface of the vertical chamber.

It will be easier to understand the invention from the following description of one embodiment, with reference to the accompanying drawings. The invention is of course in no way confined to this embodiment.

Figure 2:
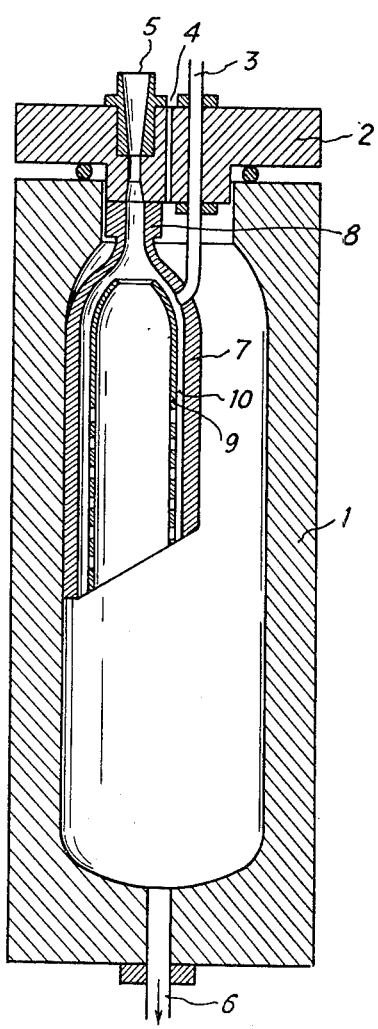
FIG. 2 is an axial sectional view taken through a separator according to the invention.

FIG. 2 shows a diagrammatical longitudinal cross-section of the new separator, with a vertical cylindrical jacket 1 and its cover 2. This cover contains three openings, for the supply pipe 3, separated gas outlet pipe 4, and a pipe 5 providing communication between the inside of the separator and a safety device (not shown here). The base of the chamber contains a pipe 6 through which the product is discharged. An elongated cylinder 7 is suspended from the cover by means of a connector 8. This first cylinder contains a concentric cylinder 9, with which it forms an annular space 10, into which the inlet pipe 3 opens.

Figure 3:
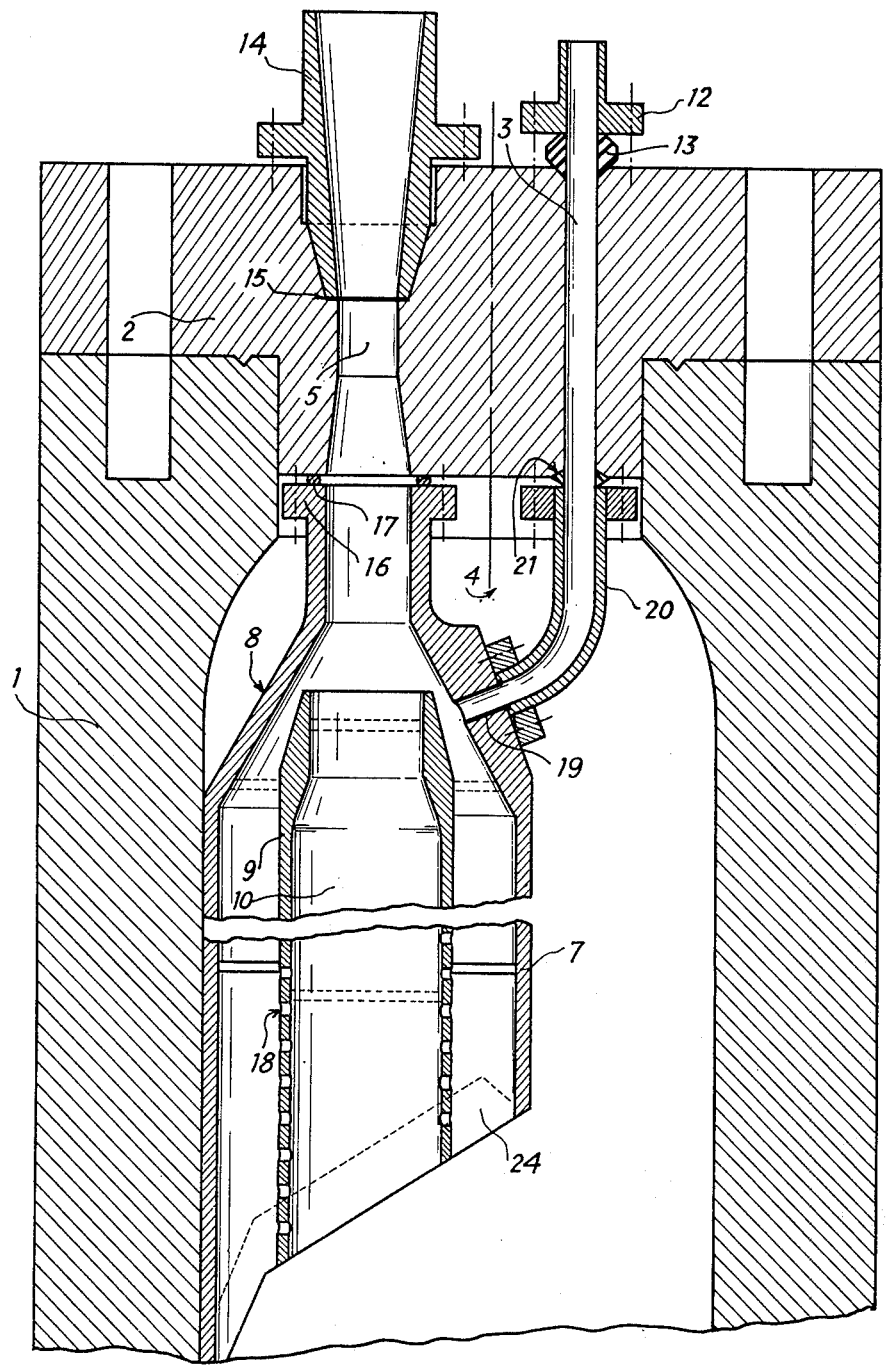
FIG. 3 is a more detailed axial sectional view of the upper part of the separator shown in FIG. 2.

FIG. 3 is a detailed cross-sectional view of the main parts indicated in FIG. 2.

The inlet pipe opening is connected, on the outside surface of the cover, to the end 12 of an external supply pipe (not shown here), through an intervening metal sealing ring 13.

The opening for the pipe 4 through which separated gas for recycling is discharged can be located by the projection of its axis on the figure.

The opening for the communicating passage 5 between the inside of the separator and the safety device, and the inside surface of a tube 14, to hold the safety device (consisting in the present case of a rupturable disc 15), are conical, to ensure faster evacuation in the event of the safety disc bursting.

The base of the cover is reinforced to allow the rupturable disc to be attached thereto.

A fourth opening (not shown here), is needed when a pressure detector is to be mounted on the separator. The elongated cylinder 7 rests against the inside surface of the cylindrical chamber 1. The dimensions of the cylinder 7 are also selected in such a way that the outside diameter is approximately two thirds of the inside diameter of the cylindrical jacket 1, and so that the lower end of the cylinder 7 extends approximately halfway down the chamber.

The cylinder 7 terminates at its top in a connector 8, the diameter of which is reduced, and which ends in a flange 16. This connector attaches the cylinder 7 to the cover 2, through an intervening metal ring 17, so that the cylinder 7 communicates through the opening 5 with the safety device, consisting of the rupturable disc 15.

The cylinder 7 contains a concentric inside cylinder 9, open at each end, containing a number of holes 18, and which defines with the cylinder 7 an annular space 10, into which the inlet pipe opens through a metal ring 19 forming an injector and located in a specially strengthened part of the connector 8.

One end of a bent tube 20 is attached to the cover 2, at the end of the inlet pipe 3, through an interposed metal sealing ring 21, and the other end is connected to the outside surface of the cylinder 7, by the metal injector ring 19.

Figure 4:
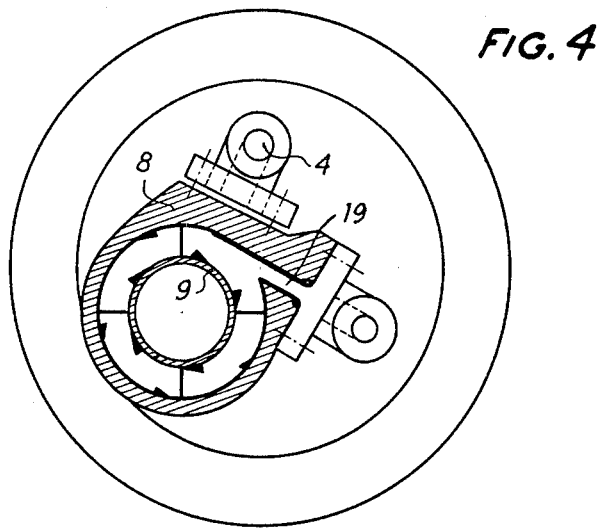
FIG. 4 is a horizontal sectional view taken through the two inner cylinders at the level of the mixture inlet, with the mixture inlet, gas outlet, and jacket shown only schematically.

FIG. 4 is a horizontal cross-sectional view, showing the inlet pipe 19, opening at a tangent into the annular space 10.

Figure 5:
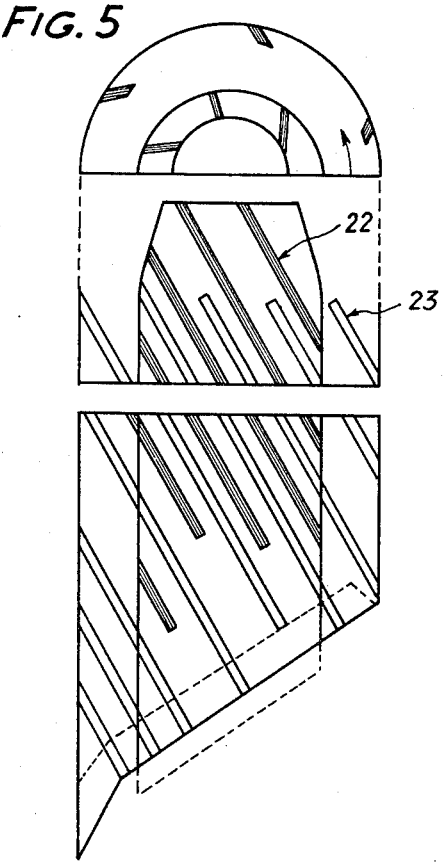
FIG. 5 is a diagrammatic view showing the deflectors on the two cylinders.

FIG. 5 shows the inside surface of the cylinder 7, fitted with a number of spiral deflectors 22, sloping at an angle of approximately 45°, and at regular distances apart, and the outside surface of the coaxial cylinder, approximately the upper two thirds of which are fitted with a number of spiral deflectors 23, the same distance apart extending in the same direction and at the same angle as those on the inside surface of the cylinder 7, but offset in relation to them.

FIGS. 3 and 5 show the lower end of the cylinder 7 and concentric cylinder 9, consisting of an oblique section located at an angle of approximately 45° to the wall of the vertical cylindrical enclosure 1 which it adjoins.

They also show a flange 24 forming a channel, fixed to the bottom inside edge of the cylinder 7.

Figure 6:
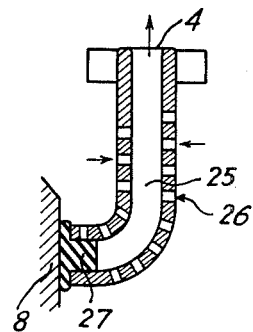
FIG. 6 is an axial sectional view taken through the tube by means of which the lower end of the gas outlet pipe is supported on the first cylinder.

FIG. 6 shows a cross-section of a bent tube 25 containing a number of holes 26. One end is fixed to the cover 2, in communication with the gas outlet opening, and the other end is attached to the outside surface of the connector 8 surmounting the cylinder 7, by a metal plug 27.

When this high-pressure separator is used, fluids for separation enter the annular space without coming into contact with separated gas, and thus without any possibility of mixing with them. As soon as the fluids enter the annular spaced, a tangential direction is inparted to them, at a velocity depending on the inside shape of the injector ring. This ensures that ideal conditions for centrifugal separation prevail from the start.

Because of the arrangement of the dual series of deflectors, the centrifugal effect is increased to a maximum. After separation, the liquid, solid or viscous particles slide along the side surface of the recipient 7 to the channel 24, thence collecting at the lowest point, against the wall of the vertical cylindrical chamber, along which they flow to the outlet at the bottom. This flow of liquid, solid or viscous particles does not traverse the zone containing separated gas, which passes through the holes in the concentric cylinder and is channelled by it, bypassing the recipient 7 on its way to the recycling outlet. The absence of any interaction between products during their respective movements after separation ensures the highest possible separation efficiency.

The particular design of the bent tube 25 should be noted, with the holes it contains. These provide protection for the gas outlet which is in communication with one end of the bent tube, the other end being attached to the connector 8 on top of the recipient 7.

The connector is accordingly attached to the cover by three rings, giving it the necessary stability to withstand strains resulting from expansion of fluids for separation and the effects of sudden pressure changes.

This new high-pressure separator has been developed to equip high-pressure polythene-synthesis reactors. It can also be used in any industrial chemical installation in which effluent from a high-pressure synthesis reactor has to be separated without any significant drop in pressure, so that gas can return to the reactor for recycling with reduced recompression, or when there is any danger of accidental pressure increases because of exothermic reactions caused by catalyst trapping.

I claim:

1. A high-pressure separator for a polyphase mixture consisting of a gas mixed with a liquid, solid or viscous product, said separator comprising a vertical jacket having openings in its upper part receiving a mixture inlet pipe, a separated gas outlet pipe, and a safety device in an outlet of said jacket responsive to excessive pressure within said separator, and an opening in its lower part serving as an outlet for said product, the improvement according to which said separator further comprises:

means for centrifugally separating said mixture comprising a first inner cylinder within said jacket, which cylinder is open at its lower end, a connector defining a duct connecting the upper end of said first cylinder to the outlet receiving said safety device, said jacket and first cylinder defining a first space therebetween, through which said duct passes, a second inner cylinder coaxially mounted within said first cylinder open at its lower end, said first and second cylinders defining a second space therebetween, with said mixture inlet pipe opening into said second space and said gas outlet pipe opening into said first space, the lower ends of said cylinders being spaced from the lower end of the jacket.

2. A high-pressure separator as defined in claim 1, in which the inlet pipe opens at a tangent into the top part of said second space.

3. A high-pressure separator as defined in claim 1, in which the first cylinder touches the inside surface of the jacket.

4. A high-pressure separator as defined in claim 1, in which the dimensions of the first inner cylinder are such that its outside diameter is approximately two thirds of the inside diameter of the jacket, while its lower end is situated approximately half-way down said jacket.

5. A high-pressure separator as defined in claim 1, in which the inside surface of the first cylinder contains a number of spiral deflectors set at regular distances apart, while approximately the upper two thirds of the outside surface of the second cylinder contains spiral deflectors the same distance apart and with the same direction and at the same angle as those on the inside surface of the jacket, but offset in relation to them.

6. A high-pressure separator as defined in claim 1, in which the lower third of the concentric cylinder has regularly spaced holes therein.

7. A high-pressure separator as defined in claim 1, in which a bent tube connects the mixture inlet opening in the jacket to the outside surface of the first cylinder, through a metal ring which forms an injector.

8. A high-pressure separator as defined in claim 1, in which one end of a bent tube containing a number of holes is attached to the jacket and connected to the separated gas outlet, while its other end is attached to the outside surface of the first cylinder by a metal plug.

9. A high-pressure separator as defined in claim 1, in which the first and second cylinders end at the bottom in a section positioned at an angle of approximately 45° to the adjoining wall of the jacket.

10. A high-pressure separator as defined in claim 9, in which a flange forming a channel is fixed to the bottom inside edge of the first cylinder.

* * * * *